United States Patent
Deaton et al.

(10) Patent No.: US 8,712,836 B2
(45) Date of Patent: Apr. 29, 2014

(54) POINT-OF-SALE SERVER AND METHOD

(75) Inventors: David W. Deaton, Abilene, TX (US);
Rodney G. Gabriel, Abilene, TX (US)

(73) Assignee: Midnight Blue Remote Access LLC, Los Altos, CA (US)

( * ) Notice: Subject to any disclaimer, the term of this patent is extended or adjusted under 35 U.S.C. 154(b) by 11 days.

(21) Appl. No.: 11/311,355

(22) Filed: Dec. 20, 2005

(65) Prior Publication Data

US 2006/0100931 A1    May 11, 2006

Related U.S. Application Data

(63) Continuation of application No. 09/360,820, filed on Jul. 26, 1999, now Pat. No. 6,993,498, which is a continuation of application No. 09/354,263, filed on Jul. 15, 1999, now abandoned.

(51) Int. Cl.
*G06Q 30/00*    (2012.01)

(52) U.S. Cl.
USPC ......................................................... 705/14.1

(58) Field of Classification Search
USPC ......................................................... 705/14
See application file for complete search history.

(56) References Cited

U.S. PATENT DOCUMENTS

| | | |
|---|---|---|
| 2,995,727 A | 8/1961 | Quade |
| 3,316,536 A | 4/1967 | Andrews et al. |
| 3,465,289 A | 9/1969 | Klein |
| 3,528,058 A | 9/1970 | Bond |
| 3,535,682 A | 10/1970 | Dykaar et al. |
| 3,576,539 A | 4/1971 | Huber |
| 3,605,092 A | 9/1971 | Richard |
| 3,629,829 A | 12/1971 | Ordower |
| 3,657,702 A | 4/1972 | Stephenson, Jr. |
| 3,697,693 A | 10/1972 | Deschenes et al. |
| 3,719,927 A | 3/1973 | Michels et al. |
| 3,786,421 A | 1/1974 | Wostl et al. |
| 3,792,437 A | 2/1974 | Blumenthal et al. |
| 3,833,885 A | 9/1974 | Gentile et al. |
| 3,876,981 A | 4/1975 | Welch |
| 3,914,789 A | 10/1975 | Coker, Jr. et al. |
| 3,941,977 A | 3/1976 | Voss et al. |
| 3,949,363 A | 4/1976 | Holm |

(Continued)

FOREIGN PATENT DOCUMENTS

| | | |
|---|---|---|
| EP | 0 511 463 A2 | 11/1992 |
| EP | 0 512 509 A2 | 11/1992 |

(Continued)

OTHER PUBLICATIONS

Amy Doan "The shopper's wallet—More and more retailers are using rewards clubs to keep customers, generate market research", San Francisco Chronicle:Jul. 31, 1998.

(Continued)

*Primary Examiner* — Matthew L Hamilton
(74) *Attorney, Agent, or Firm* — Sterne, Kessler, Goldstein & Fox P.L.L.C.

(57) ABSTRACT

A method for use in marketing includes detecting, at the point-of-sale, a plurality of Uniform Product Codes associated with respective items purchased by a customer. The method also includes transmitting, on a substantially real-time basis, the plurality of Uniform Product Codes over the Internet to a remote computer connected to the Internet.

22 Claims, 4 Drawing Sheets

(56) References Cited

U.S. PATENT DOCUMENTS

| | | |
|---|---|---|
| 3,959,624 A | 5/1976 | Kaslow |
| 3,987,411 A | 10/1976 | Kruklitis et al. |
| 4,002,886 A | 1/1977 | Sundelin |
| 4,015,701 A | 4/1977 | Templeton |
| 4,017,835 A | 4/1977 | Randolph |
| 4,027,142 A | 5/1977 | Paup et al. |
| 4,053,735 A | 10/1977 | Foudos |
| 4,053,737 A | 10/1977 | Lafevers et al. |
| 4,063,070 A | 12/1977 | Delarue et al. |
| 4,087,789 A | 5/1978 | Beery |
| 4,088,879 A | 5/1978 | Banka et al. |
| 4,091,448 A | 5/1978 | Clausing |
| 4,107,653 A | 8/1978 | Kruklitis |
| 4,109,238 A | 8/1978 | Creekmore |
| 4,114,027 A | 9/1978 | Slater et al. |
| 4,124,109 A | 11/1978 | Bissell et al. |
| 4,127,770 A | 11/1978 | Baader |
| 4,142,235 A | 2/1979 | Tadakuma et al. |
| 4,143,355 A | 3/1979 | MacIntyre |
| 4,143,356 A | 3/1979 | Nally |
| 4,148,010 A | 4/1979 | Shiau |
| 4,176,783 A | 12/1979 | Eppich |
| 4,201,978 A | 5/1980 | Nally |
| 4,208,575 A | 6/1980 | Haltof |
| 4,245,211 A | 1/1981 | Kao |
| RE30,579 E | 4/1981 | Goldman et al. |
| RE30,580 E | 4/1981 | Goldman et al. |
| 4,260,880 A | 4/1981 | Thomas |
| 4,277,689 A | 7/1981 | Thomas et al. |
| RE30,821 E | 12/1981 | Goldman |
| 4,325,117 A | 4/1982 | Parmet et al. |
| 4,332,325 A | 6/1982 | Manizza |
| 4,356,472 A | 10/1982 | Hau-Chun Ku et al. |
| 4,380,734 A | 4/1983 | Allerton |
| 4,381,494 A | 4/1983 | Wisner |
| 4,396,902 A | 8/1983 | Warthan et al. |
| 4,399,553 A | 8/1983 | Toyama |
| 4,404,649 A | 9/1983 | Nunley et al. |
| 4,425,626 A | 1/1984 | Parmet et al. |
| 4,439,670 A | 3/1984 | Basset et al. |
| 4,441,204 A | 4/1984 | Hanna |
| 4,453,074 A | 6/1984 | Weinstein |
| 4,485,300 A | 11/1984 | Peirce |
| 4,510,615 A | 4/1985 | Rohrer |
| 4,523,330 A | 6/1985 | Cain |
| 4,547,780 A | 10/1985 | Cummins |
| 4,547,899 A | 10/1985 | Nally et al. |
| 4,554,446 A | 11/1985 | Murphy et al. |
| 4,595,997 A | 6/1986 | Parmet et al. |
| 4,617,457 A | 10/1986 | Granzow et al. |
| 4,628,194 A | 12/1986 | Dobbins et al. |
| 4,630,201 A | 12/1986 | White |
| 4,670,853 A | 6/1987 | Stepien |
| 4,672,377 A | 6/1987 | Murphy et al. |
| 4,672,572 A | 6/1987 | Alsberg |
| 4,673,802 A | 6/1987 | Ohmae et al. |
| 4,674,041 A | 6/1987 | Lemon et al. |
| 4,674,802 A | 6/1987 | McKenna et al. |
| 4,676,343 A | 6/1987 | Humble et al. |
| 4,678,895 A | 7/1987 | Tateisi et al. |
| 4,703,423 A | 10/1987 | Bado et al. |
| 4,722,054 A | 1/1988 | Yorozu et al. |
| 4,723,212 A | 2/1988 | Mindrum et al. |
| 4,727,243 A | 2/1988 | Savar |
| 4,745,468 A | 5/1988 | Von Kohorn |
| 4,748,668 A | 5/1988 | Shamir et al. |
| 4,748,673 A | 5/1988 | Barre et al. |
| 4,750,119 A | 6/1988 | Cohen et al. |
| 4,776,021 A | 10/1988 | Ho |
| 4,791,281 A | 12/1988 | Johnsen et al. |
| 4,797,938 A | 1/1989 | Will |
| 4,799,156 A | 1/1989 | Shavit et al. |
| 4,809,351 A | 2/1989 | Abramovitz et al. |
| 4,810,866 A | 3/1989 | Lord, Jr. |
| 4,812,628 A | 3/1989 | Boston et al. |
| 4,821,186 A | 4/1989 | Munakata et al. |
| 4,825,045 A | 4/1989 | Humble |
| 4,833,308 A | 5/1989 | Humble |
| 4,872,113 A | 10/1989 | Dinerstein |
| 4,876,592 A | 10/1989 | Von Kohorn |
| 4,882,675 A | 11/1989 | Nichtberger et al. |
| 4,885,685 A | 12/1989 | Wolfberg et al. |
| 4,887,207 A | 12/1989 | Natarajan |
| 4,891,503 A | 1/1990 | Jewell |
| 4,897,880 A | 1/1990 | Wilber et al. |
| 4,908,761 A | 3/1990 | Tai |
| 4,910,672 A | 3/1990 | Off et al. |
| 4,926,255 A | 5/1990 | Von Kohorn |
| 4,933,536 A | 6/1990 | Lindemann et al. |
| 4,941,090 A | 7/1990 | McCarthy |
| 4,947,321 A | 8/1990 | Spence et al. |
| 4,949,256 A | 8/1990 | Humble |
| 4,972,504 A | 11/1990 | Daniel, Jr. et al. |
| 4,975,841 A | 12/1990 | Kehnemuyi et al. |
| 4,982,346 A | 1/1991 | Girouard et al. |
| 4,993,068 A | 2/1991 | Piosenka et al. |
| 5,008,518 A | 4/1991 | Taussig et al. |
| 5,010,485 A | 4/1991 | Bigari |
| 5,014,324 A | 5/1991 | Mazumder |
| 5,025,372 A | 6/1991 | Burton et al. |
| 5,034,807 A | 7/1991 | Von Kohorn |
| 5,039,848 A | 8/1991 | Stoken |
| 5,040,226 A | 8/1991 | Elischer et al. |
| 5,053,607 A | 10/1991 | Carlson et al. |
| 5,053,955 A | 10/1991 | Peach et al. |
| 5,054,092 A | 10/1991 | LaCaze |
| 5,056,019 A | 10/1991 | Schultz et al. |
| 5,057,915 A | 10/1991 | Von Kohorn |
| 5,070,452 A | 12/1991 | Doyle, Jr. et al. |
| 5,077,805 A | 12/1991 | Tan |
| 5,091,634 A | 2/1992 | Finch et al. |
| 5,095,195 A | 3/1992 | Harman et al. |
| 5,117,355 A | 5/1992 | McCarthy |
| 5,128,520 A | 7/1992 | Rando et al. |
| 5,128,752 A | 7/1992 | Von Kohorn |
| 5,172,314 A | 12/1992 | Poland et al. |
| 5,173,851 A | 12/1992 | Off et al. |
| 5,179,375 A | 1/1993 | Dick et al. |
| 5,185,695 A | 2/1993 | Pruchnicki |
| 5,201,010 A | 4/1993 | Deaton et al. |
| 5,202,826 A | 4/1993 | McCarthy |
| 5,227,874 A | 7/1993 | Von Kohorn |
| 5,235,345 A | 8/1993 | Ohno et al. |
| 5,237,496 A | 8/1993 | Kagami et al. |
| 5,237,620 A | 8/1993 | Deaton et al. |
| 5,245,164 A | 9/1993 | Oyama |
| 5,245,533 A | 9/1993 | Marshall |
| 5,249,044 A | 9/1993 | Von Kohorn |
| 5,251,152 A | 10/1993 | Notess |
| 5,253,345 A | 10/1993 | Fernandes et al. |
| 5,256,863 A | 10/1993 | Ferguson et al. |
| 5,283,734 A | 2/1994 | Von Kohorn |
| 5,305,196 A | 4/1994 | Deaton et al. |
| 5,310,997 A | 5/1994 | Roach et al. |
| 5,327,508 A | 7/1994 | Deaton et al. |
| 5,337,253 A | 8/1994 | Berkovsky et al. |
| 5,353,218 A | 10/1994 | De Lapa et al. |
| 5,368,129 A | 11/1994 | Von Kohorn |
| 5,388,165 A | 2/1995 | Deaton et al. |
| RE34,915 E | 4/1995 | Nichtberger et al. |
| 5,430,644 A | 7/1995 | Deaton et al. |
| 5,448,471 A | 9/1995 | Deaton et al. |
| 5,459,306 A | 10/1995 | Stein et al. |
| 5,481,094 A | 1/1996 | Suda |
| 5,483,049 A | 1/1996 | Schulze, Jr. |
| 5,493,107 A | 2/1996 | Gupta et al. |
| 5,508,731 A | 4/1996 | Kohorn |
| 5,515,098 A | 5/1996 | Carles |
| 5,526,863 A | 6/1996 | Hodges |
| 5,537,314 A | 7/1996 | Kanter |
| 5,592,560 A | 1/1997 | Deaton et al. |
| 5,604,788 A | 2/1997 | Tett |
| 5,612,527 A | 3/1997 | Ovadia |
| 5,612,868 A | 3/1997 | Off et al. |

(56) References Cited

U.S. PATENT DOCUMENTS

| | | | |
|---|---|---|---|
| 5,621,812 A | 4/1997 | Deaton et al. | |
| 5,632,010 A | 5/1997 | Briechle et al. | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,675,662 A | 10/1997 | Deaton et al. | |
| 5,687,322 A | 11/1997 | Deaton et al. | |
| 5,697,844 A | 12/1997 | Von Kohorn | |
| 5,708,782 A | 1/1998 | Larson et al. | |
| 5,710,886 A | 1/1998 | Christensen et al. | |
| 5,712,989 A | 1/1998 | Johnson et al. | |
| 5,713,795 A | 2/1998 | Kohorn | |
| 5,717,866 A | 2/1998 | Naftzger | |
| 5,719,382 A | 2/1998 | White | |
| 5,727,153 A * | 3/1998 | Powell | 705/14 |
| 5,740,549 A | 4/1998 | Reilly et al. | |
| 5,751,257 A | 5/1998 | Sutherland | |
| 5,759,101 A | 6/1998 | Von Kohorn | |
| 5,761,648 A | 6/1998 | Golden et al. | |
| 5,765,143 A | 6/1998 | Sheldon et al. | |
| 5,771,172 A | 6/1998 | Yamamoto et al. | |
| 5,781,894 A | 7/1998 | Petrecca et al. | |
| 5,793,972 A | 8/1998 | Shane | |
| 5,797,132 A | 8/1998 | Altwasser | |
| 5,806,044 A | 9/1998 | Powell | |
| 5,806,045 A | 9/1998 | Biorge et al. | |
| 5,819,954 A | 10/1998 | Lacriola | |
| 5,822,735 A | 10/1998 | De Lapa et al. | |
| 5,832,456 A | 11/1998 | Fox et al. | |
| 5,832,457 A | 11/1998 | O'Brien et al. | |
| 5,844,221 A | 12/1998 | Madigan, Jr. et al. | |
| 5,845,259 A | 12/1998 | West et al. | |
| 5,845,529 A | 12/1998 | Moshe et al. | |
| 5,850,446 A | 12/1998 | Berger et al. | |
| 5,854,746 A | 12/1998 | Yamamoto et al. | |
| 5,855,007 A | 12/1998 | Jovicic et al. | |
| 5,857,175 A | 1/1999 | Day et al. | |
| 5,870,714 A | 2/1999 | Shetty et al. | |
| 5,873,069 A | 2/1999 | Reuhl et al. | |
| 5,875,415 A | 2/1999 | Lieb et al. | |
| 5,878,401 A | 3/1999 | Joseph | |
| 5,887,271 A | 3/1999 | Powell | |
| 5,899,980 A | 5/1999 | Wilf et al. | |
| 5,905,246 A | 5/1999 | Fajkowski | |
| 5,907,350 A | 5/1999 | Nemirofsky | |
| 5,907,830 A | 5/1999 | Engel et al. | |
| 5,913,210 A | 6/1999 | Call | |
| 5,918,211 A | 6/1999 | Sloane | |
| 5,918,212 A | 6/1999 | Goodwin, III | |
| 5,918,214 A | 6/1999 | Perkowski | |
| 5,933,813 A | 8/1999 | Teicher et al. | |
| 5,937,391 A | 8/1999 | Ikeda et al. | |
| 5,963,133 A | 10/1999 | Monjo | |
| 5,974,399 A | 10/1999 | Guiliani et al. | |
| 6,003,013 A | 12/1999 | Boushy et al. | |
| 6,009,407 A | 12/1999 | Garg | |
| 6,009,411 A | 12/1999 | Kepecs | |
| 6,012,040 A | 1/2000 | Goodwin, III | |
| 6,014,634 A | 1/2000 | Scroogie et al. | |
| 6,021,362 A | 2/2000 | Maggard et al. | |
| 6,035,280 A | 3/2000 | Christensen | |
| 6,055,573 A | 4/2000 | Gardenswartz et al. | |
| 6,061,660 A | 5/2000 | Eggleston et al. | |
| 6,070,147 A | 5/2000 | Harms et al. | |
| 6,076,068 A | 6/2000 | De Lapa et al. | |
| 6,076,070 A | 6/2000 | Stack | |
| 6,078,897 A | 6/2000 | Rubin et al. | |
| 6,102,969 A | 8/2000 | Christianson et al. | |
| 6,129,274 A | 10/2000 | Suzuki | |
| 6,129,276 A * | 10/2000 | Jelen et al. | 235/383 |
| 6,138,911 A | 10/2000 | Fredregill et al. | |
| 6,141,010 A | 10/2000 | Hoyle | |
| 6,142,371 A | 11/2000 | Oneda | |
| 6,154,738 A | 11/2000 | Call | |
| 6,185,541 B1 | 2/2001 | Scroggie et al. | |
| 6,216,129 B1 | 4/2001 | Eldering | |
| 6,236,985 B1 | 5/2001 | Aggarwal et al. | |
| 6,246,997 B1 | 6/2001 | Cybul et al. | |
| 6,249,772 B1 | 6/2001 | Walker et al. | |
| 6,260,024 B1 | 7/2001 | Shkedy | |
| 6,269,343 B1 | 7/2001 | Pallakoff | |
| 6,278,979 B1 | 8/2001 | Williams | |
| 6,292,786 B1 | 9/2001 | Deaton et al. | |
| 6,307,958 B1 | 10/2001 | Deaton et al. | |
| 6,314,406 B1 | 11/2001 | O'Hagan et al. | |
| 6,317,722 B1 | 11/2001 | Jacobi et al. | |
| 6,321,208 B1 * | 11/2001 | Barnett et al. | 705/14.36 |
| 6,321,210 B1 | 11/2001 | O'Brien et al. | |
| 6,321,984 B1 | 11/2001 | McCall et al. | |
| 6,330,543 B1 | 12/2001 | Kepecs | |
| 6,332,128 B1 | 12/2001 | Nicholson | |
| 6,334,108 B1 | 12/2001 | Deaton et al. | |
| 6,336,099 B1 | 1/2002 | Barnett et al. | |
| 6,351,735 B1 | 2/2002 | Deaton et al. | |
| 6,377,935 B1 | 4/2002 | Deaton et al. | |
| 6,424,949 B1 | 7/2002 | Deaton et al. | |
| 6,484,146 B2 * | 11/2002 | Day et al. | 705/14 |
| 6,516,302 B1 | 2/2003 | Deaton et al. | |
| 6,609,104 B1 | 8/2003 | Deaton et al. | |
| 6,611,811 B1 | 8/2003 | Deaton et al. | |
| 6,684,195 B1 | 1/2004 | Deaton et al. | |
| 6,741,968 B2 | 5/2004 | Jacoves et al. | |
| 6,993,498 B1 | 1/2006 | Deaton et al. | |
| 6,999,914 B1 | 2/2006 | Boerner et al. | |
| 7,231,357 B1 * | 6/2007 | Shanman et al. | 705/14.23 |
| 7,236,942 B1 * | 6/2007 | Walker et al. | 705/14.65 |
| 7,464,050 B1 | 12/2008 | Deaton et al. | |
| 2001/0014868 A1 | 8/2001 | Herz et al. | |
| 2001/0021914 A1 | 9/2001 | Jacobi et al. | |
| 2002/0002485 A1 * | 1/2002 | O'Brien et al. | 705/14 |
| 2002/0026350 A1 | 2/2002 | Wendkos | |
| 2003/0195806 A1 * | 10/2003 | Willman et al. | 705/14 |
| 2010/0106587 A1 * | 4/2010 | Walker et al. | 705/14.23 |
| 2012/0136720 A1 * | 5/2012 | Walker et al. | 705/14.51 |

FOREIGN PATENT DOCUMENTS

| | | |
|---|---|---|
| EP | 0 708 409 A2 | 4/1996 |
| EP | 0 749 091 A2 | 12/1996 |
| EP | 0 837 438 A2 | 4/1998 |
| GB | 1 525 928 | 9/1978 |
| GB | 2 094 532 A | 9/1982 |
| JP | 52-16941 | 2/1977 |
| JP | 55-47560 | 4/1980 |
| JP | 56-27468 | 3/1981 |
| JP | 58-155475 | 9/1983 |
| JP | 58-178475 | 10/1983 |
| JP | 59-94166 | 5/1984 |
| JP | 59-184965 | 10/1984 |
| JP | 59-186965 | 12/1984 |
| JP | 52-16941 | 8/1993 |
| JP | 9-101988 | 4/1997 |
| WO | WO 86/03310 A1 | 6/1986 |
| WO | WO 91/03789 A1 | 3/1991 |
| WO | WO 95/03570 A2 | 2/1995 |
| WO | WO 96/41289 A2 | 12/1996 |
| WO | WO 97/08638 A1 | 3/1997 |
| WO | WO 97/23838 A1 | 7/1997 |
| WO | WO 98/14921 A1 | 4/1998 |
| WO | WO 98/21713 A2 | 5/1998 |

OTHER PUBLICATIONS

Stop Bad Check Losses—Without Lifting the Phone, Drug Topics, Sep. 15, 1986, p. 42 (pritout of online version, 1 sheet).
English Abstract for Japanese Patent Publication No. JP52016941, 1 page.
English Abstract for Japanese Patent Publication No. JP55047560, 1 page.
English Abstract for Japanese Patent Publication No. JP56027468, 1 page.

(56) References Cited

OTHER PUBLICATIONS

English Abstract for Japanese Patent Publication No. JP58155475, 1 page.
English Abstract for Japanese Patent Publication No. JP58178475, 1 page.
English Abstract for Japanese Patent Publication No. JP59094166, 1 page.
English Abstract for Japanese Patent Publication No. JP59184965, 1 page.
English Abstract for Japanese Patent Publication No. JP9101988, 1 page.
Deaton et al., U.S. Appl. No. 10/609,331, filed Jun. 26, 2003, entitled "Method and System for Facilitating Consumer Purchases".
Deaton et al., U.S. Appl. No. 11/212,140, filed Aug. 26, 2005, entitled "Method and System for Accumulating Marginal Discounts and Applying an Associated Incentive Upon Achieving Threshold".
Alba Joseph et al.; "Interactive Home Shopping"; Journal of Marketing, vol. 61, Jul. 1997, pp. 38-53.
American National Standard Specifications for Placement and Location of MICR Printing—X9.13 American Bankers Association, May 4, 1990 (22 sheets).
Amy Doan "The shopper's wallet-More and more retailers are using rewards clubs to keep customers, generate market research", San Francisco Chronicle:Jul. 31, 1998.
Boyd, "New directions in supermarkets," Incentive, v168, n11, pp. 41-45, Nov. 1994.
Bradley Johnson, "Catalina Adds Coupon Options," Advertising Age, pp. 1 and 58, Nov. 26, 1990; and printout of online version (2 sheets).
Carlene A. Thissen, "Front-End Electronic Marketing—Frequent Shopper and Other Programs," Food Marketing Institute, 1991; cover page and pp. i-x and 1-70.
Carlene A. Thissen, "Perspectives on Electronic Marketing with Emphasis on Promotion Inside Supermarkets," Food Marketing Institute, 3 cover pages and pp. i-v and 1-39, May 1990.
Carlene Thissen & John Karolefski, "Target 2000: The Rising Tide of TechnoMarketing," American Book Company, 1998. (book).
Carole Sugarman, "In-Store Computer Terminals, A Super Marketing Device," The Washington Post, May 28, 1986 (printout of online verison, 4 sheets).
Catalina Marketing Corp. Outmaneuvers Citicorp POS, Industry Leader Launches Frequent Shopper Program in Electronic Network of 2,500 Stores, News Release, PR Newswire, Jun. 16, 1989 (printout of online version, 2 sheets).
Cathy Cebulski, "P&G, Central Trust Develop Electronic Marketing System," The Greater Cincinnati Business Record, p. 4, Mar. 26-Apr. 1, 1990.
Central Trust/P&G Card Links Shopper Purchases, Bank Marketing Magazine, Sep. 1988, p. 51 (printout of online version, 1 sheet).
Checking Checks at DeMoulas, Chain Store Age Executive, vol. 59, No. 2, Feb. 1983, pp. 18-19; with printout of online abstract (1 sheet).
Checking Checks, Miami Herald, Jun. 15, 1987, p. s-17 (printout of online version, 1 sheet).
Cleveland Shoppers Save Money With New Electronic Checkout System, PR Newswire, p. 1, Nov. 17, 1988 (printout on online version, 1 sheet).
Co-op Links Scanning With Promotions, Retail Automation, Nov./Dec. 1988, pp. 21-22.
David Goldsmith, "Electronic Coupons," Target Marketing, North American Publishing Co., Jul. 1987, (1 sheet).
DIY Promos Via Video POS, Chain Store Age Executive, vol. 64, No. 4, cover page and pp. 76, 78, Apr. 1988; and printout of online version (3 sheets).
Egon Schmidt, "Der Glaseme Verbraucher", Elektronik, vol. 40, No. 23, Nov. 12, 1991, pp. 42-45; with English translation, pp. 1-13.
Fensholt, Carol; "Shelf Labels Go Electronic, Merchandising Goes Dynamic," Supermarket Business, vol. 43, No. 5, May, 1988, p. 46(4).
Focus on general merchandise, Supermarket News, v35, p. S4(20), Mar. 1985.
Forger, Gary, "Real-time Control Drives JIT Success," Modern Materials Handling; Boston; vol. 47, Issue 12, Oct. 1992, extracted on Internet from Proquest database, http://progquest.umi.com on Feb. 25, 2002.
Garry, Michael; "Will Supermarket Play Electronic Tag?", Progressive Grocer, Jul. 1991, pp. 99-104.
Giant to Test Supermarket Cash Rebates, Washington Post, Jun. 14, 1989, pp. A1, A32 (printout of online version, 1 sheet).
Grocery Stores Copy Airlines With Frequent Buyer Bonuses, Wall Street Journal 3 Star, Eastern Edition, Aug. 7, 1986, p. 21 (printout of online version, 1 sheet).
GTE Joins Proctor & Gamble and Others in New Technology Partnership, PR Newswire, vol. 0, No. 0, p. 1, Jun. 26, 1990 (printout of online abstract, 1 sheet).
Hall Daniel; "Electronic Tags Aglow in 2 Units," Supermarket News, vol. 37, No. 49, Dec. 7, 1997, p. 43(1).
Hitting the Target, Retail Automation, Nov./Dec. 1990, pp. 12-13.
Holly Klokis, "UKROP's Test Data Base Marketing Program—Electronic Couponing Tracks Buying Behavior of Valued Customers," Chain Store Age Executive, Sep. 1987 (3 sheets).
Instant Coupons on Video Screens Set for Test Run at Finast Checkouts, Plain Dealer, Cleveland, Ohio, Nov. 18, 1988, p. B15 (printout of online version, 1 sheet).
Interactive POS Video Yields Instant Results, Chain Store Age Executive, Sep. 1988, cover sheet and pp. 52-53 and 55.
Jeffrey Kutler, "Chase Forms Alliance with Terminal Vendor," The American Banker, May 18, 1988 (printout of online version, 2 sheets).
Laurie Petersen, "Frequent Buyer Mania", Adweek's Marketing Week, vol. 30, Jul. 10, 1989 (printout of online version, 2 sheets).
Lena H. Sun, "Checking Out the Customer," The Washington Post, Jul. 9, 1989 (5 sheets).
Linda P. Campbell, "Looking for Ways to Protect Privacy—Caller ID Brings Calls for Safeguards," Chicago Tribune, Sec. C, p. 21 (printout of online version, 4 sheets).
Lorrie Grant, "Let Your Fingers Do Shopping . . . In Store," USA Today, Jul. 28, 1999, p. 3B (1 sheet); and printout of online version (3 sheets).
Lynette D. Hazelton, "What's New in Supermarket Promotion—Tracking Shoppers with Personal Bar Codes", New York Times, Jun. 18, 1989 (1 sheet).
Lynn Coleman, "'Smart Card,' Coupon Eater Targeted to Grocery Retailers", Marketing News, American Marketing Association, Jun. 6, 1988, vol. 22, No. 12 (2 sheets).
Martha Groves, "Frequent-Shopper Plans are Wooing Customers," Los Angeles Times, pp. 1 and 36-37, Oct. 1, 1989 (4 sheets).
Michael Freitag, "In This Computer Age, Who Needs Coupons?" New York Times, Jun. 15, 1989 (1 sheet).
Michael Gates, "Database Marketing—The Unfulfilled Promise," Incentive, Sep. 1989 (5 sheets).
Mindy Fetterman, "Capturing Customers in a Cool Economy," USA Today, p. 8B, Nov. 19, 1990 (printout of online version, 1 sheet).
Mollie Neal, "Quaker's Direct Hit," Direct Marketing, vol. 53, No. 9, p. 52, Jan. 1991 (printout of online version, 5 sheets).
Murray Raphel, "Take a Card . . . Any Card Please!", Direct Marketing, pp. 63-68, Feb. 1990.
Nancy Zeldis, "Targeted Coupons Hit Non-Users," Advertising Age, p. S-26, Apr. 27, 1987 (3 sheets).
Pioneer offers special finance options for 1999; New programs designed to aid crop producers following challenging year, PR Newswire:Oct. 30, 1998.
PurPura, "Ralphs will test Secure Couponing on Internet," Supermarket News, v47, n34, p. 17+, Aug. 1997.
Ronald Tanner, "A New Dimension in Marketing," Progressive Grocer, vol. 66, No. 5, May 1987, cover page and pp. 133-134, 136.
Russ Stanton, "Notebook" The Orange County Register, Nov. 8, 1990 (printout of online version, 1 sheet).
S&H, Saffer Reward Frequent Shoppers, Advertising Age, Mar. 16, 1987, p. 22 (printout of online version, 1 sheet).
Samuel Berke, "An Analysis of Various Check Verification Services," The Credit World, vol. 65, No. 1, Oct. 1976, pp. 20-21; with printout of online abstract (1 sheet).

(56) References Cited

OTHER PUBLICATIONS

Scanning a New Horizon Food & Beverage Marketing, Aug. 1989, cover page, index page, and pp. 32-33 (7 sheets).
Sidney Feltenstein, et al., "Does Couponing Make Good Business Sense?," Restaurant Business Magazine, vol. 90, No. 2, p. 152, Jan. 20, 1991 (printout of online version, 2 sheets).
SSDS Inc., and Inter-Act Systems implement new "clipless" coupon program in major grocery stores in the Northeast. Business Wire, p. 9041023, Sep. 4, 1996.
Stop Bad Check Losses—Without Lifting the Phone, Drug Topics, Sep. 15, 1986, p. 42 (printout of online version, 1 sheet).
Stuart Elliot, "A Last Hurdle for Shoppers: The Checkout-Counter Pitch," New York Times, late ed., Jan. 11, 1993, Sec. D., front page and p. 7 (4 sheets); and printout of online version (2 sheets).
Supermarket Trims Bad Check Losses Via On-Line Authorization, The Data Communications User, Jul. 1975, pp. 41-42.
Susan Zimmerman, "Holiday Expands Electronic Couponing", Supermarket News, vol. 38, No. 33, Aug. 14, 1988 (2 sheets).
Trying to Get Smart, Retail Automation, May/Jun. 1989, pp. 9-10.
U.S. Appl. No. 09/320,114, entitled "Method and System for Providing Customer Incentives Utilizing Dual Customer Identifications," inventor(s) Deaton et al., May 26, 1999.
U.S. Appl. No. 09/372,356, entitled "Method and System for Coupon Redemption Verification and Crediting," inventor(s) Deaton et al., Aug. 11, 1999.
U.S. Appl. No. 09/372,376, entitled "Method and System for Responding to Market Conditions," inventor(s) Deaton et al., Aug. 11, 1999.
U.S. Appl. No. 09/372,412, entitled "Method and System for Facilitating Consumer Purchases," inventor(s) Deaton et al., Aug. 11, 1999.
U.S. Appl. No. 09/372,446, entitled "Method and System for Price Reduction Reconciliation," inventor(s) Deaton et al., Aug. 11, 1999.
U.S. Appl. No. 09/372,451, entitled "Method and System for Compiling a Plurality of Incentives Directed to a Common Recipient," inventor(s) Deaton et al., Aug. 11, 1999.
U.S. Appl. No. 09/372,452, entitled "Method and Apparatus for Filtering Point-of-Sale Information," inventor(s) Deaton, et al., Aug. 11, 1999.
U.S. Appl. No. 09/375,603, entitled "Method and System for Providing Customer Incentives Utilizing Dual Customer Identifications, and Differentiated Incentives," inventor(s) Deaton et al., Aug. 17, 1999.
U.S. Appl. No. 09/376,545, entitled "Method and System for Providing Customer Incentives at the Point-of-Sale," inventor(s) Deaton et al., Aug. 18, 1999.
U.S. Appl. No. 09/378,779, entitled "Method and System for Providing Customer Incentives Utilizing Dual Customer Identifications," inventor(s) Deaton et al., Aug. 19, 1999.
U.S. Appl. No. 09/395,306, entitled "Method and System for Providing Customer Incentives Utilizing Dual Customer Identifications and Selected Products," inventor(s) Deaton et al., Sep. 13, 1999.
U.S. Appl. No. 09/396,838, entitled "Method and System for Providing Customer Incentives Utilizing Communication of Selected Product Incentives," inventor(s) Deaton et al., Sep. 15, 1999.
U.S. Appl. No. 09/398,123, entitled "Method and System for Customer Promotion," inventor(s) Deaton et al., Sep. 16, 1999.
U.S. Appl. No. 09/414,829, entitled "Method and System for Differentiated Customer Promotion," inventor(s) Deaton et al., Oct. 6, 1999.
U.S. Appl. No. 09/414,830, entitled "Method and System for Differentiated Customer Promotion," inventor(s) Deaton et al., Oct. 6, 1999.
U.S. Appl. No. 09/420,639, entitled "Method and System for use in Generating an Advertising Message," inventor(s) Deaton et al., Oct. 21, 1999.
U.S. Appl. No. 09/885,045, entitled "Method and System for Generating Incentives in Response to Substantially Real-Time Product Purchase Information," inventor(s) Deaton et al., Jun. 19, 2001.
Web-Based Couponing, Ads Tested at Randalls (Randalls Food Markets tests link to web sites that offers a customized virtual store in which customers can find store specials and download coupons); Supermarket News, v. 47, n. 22, p. 25+, Jun. 2, 1997.
Zimmerman, Denise; "Electronic Sticker Shock: Retailers Say Cost Is a Drawback . . . of Electronic Shelf Labels," Supermarket News, vol. 45., No. 38, Sep. 8, 1995, p. 17(2).
Zimmerman, Denise; "Fiesta Mart to Test Radio Shelf Labeling," Supermarket News, vol. 45, No. 6, Feb. 1995, p. 9(2).
U.S. Appl. No. 09/354,263, filed Jul. 15, 1999, Deaton et al.
Catalina publication "Checkout Savings System and Frequency Marketing Overview". 33 pages.
Catalina publication—Market Imaging Systems dated Sep. 18, 1990, 21 pages.
Decision on 633(b)-(e) and 642 motions in the parent 104,208 Interference, mailed Jun. 28, 2000, 102 pages.
"Electronic Mom and Pop," Supermarket News, 5 pages.
Facsimile to Alun Palmer dated Oct. 26, 2000, 10 pages.
Facsimile to John Halak dated Oct. 23, 2000.
First declaration of Art Parmet, Nov. 13, 1998, 7 pages.
First declaration of Betty Amendola, Dec. 8, 1998, 3 pages.
First declaration of Dan Granger, Dec. 17, 1998, 3 pages.
First declaration of Gary Katz, Nov. 15, 1998, 71 pages.
First Declaration of Helen Monat, Nov. 15, 1998, 4 pages.
First Declaration of James S. Spence.
First Declaration of Michael O'Brien, Nov. 13, 1998, 3 pages.
First Declaration of Robert S. Ukrop (See Motion 43), Apr. 2, 1999, 3 pages.
First Declaration of Roy Van Denburg, Nov. 17, 1998, 69 pages.
First Declaration of Sue Klug, Dec. 16, 1998, 3 pages.
First Declaration of Tom Wilson, Dec. 16, 1998, 3 pages.
Fourth Declaration of Gary Katz, Apr. 14, 1999, 9 pages.
Fourth Declaration of Roy Van Denburg, Apr. 10, 1999, 5 pages.
"Frequent Shopper Programme at Vons", The IBM International Executive Conference for Retailers, Jun. 13-15, 1990, 30 pages.
"Interactive POS Video Yields Instant Results", Chain Store Age Executive, Sep. 1988, cover sheet and pp. 52-53 and 55.
Laurie Petersen, "Catalina Launches Two New Coupon Programs," Adweek, Nov. 12, 1990 (printout of online version, 1 sheet).
Laurie Petersen, "Frequent Buyer Mania", Adweek's Marketing Week, vol. 30, Jul. 10, 1989, (printout of online version, 5 sheets).
Lena H. Sun, "Checking Out The Customer," The Washington Post, Jul. 9, 1989, 5 sheets.
Lexis Printout. Results of Lexis search of POS check reading system known to Mr. Vandenburgh.
Lexis Printout. Stanton, "Notebook" in Evening Edition, Nov. 8, 1990, 1 page.
Linda P. Campbell, "Looking for Ways to Protect PrivacyCaller ID Brings Calls for Safeguards," Chicago Tribune, Sec. C, p. 21, May 13, 1990, 4 sheets.
Lorrie Grant, "Let Your Fingers Do Shopping . . . In Store," USA Today, Jul. 28, 1999, p. 3B and printout of online version, 3 sheets.
Lynn Coleman, "'Smart Card,' Coupon Eater Targeted to Grocery Retailers", Marketing News, American Marketing Association, Jun. 6, 1988, vol. 22, No. 12, 2 sheets.
Lynette D. Hazelton, "What's New in Supermarket Promotion—Tracking Shoppers with Personal Bar Codes", NewYork Times, Jun. 18, 1989, 2 pages.
Merriam Webster's Collegiate Dictionary 10th edition. p. 993 definition of "representative", 1993, 4 pages.
O'Brien's 37 CFR 1.639 (b) Declaration of Christopher Ward, Oct. 4, 2000, 68 pages.
Page 304 (contraining the definition of "computer") of the Second College Edition of The American Heritage Dictionary, copyright 1985.
Photocopy of cover of folder at FMI library entitled "Front End Electronic Marketing 1991-1992 Shopper Services," photocopy of date stamped cover page of "Point of Scan" Jan. 1991 date stamped "Received Feb. 28, 1991 F. M. I. Information Service," and photocopy of the entire Jan. 1991 issue, and date stamped by FMI library on Feb. 28, 1991; all from the FMI library file, 125 pages.
Point-of-Scan, Electronic Frequent Shoppers Program. The Newsletter of Electronic Marketing, Jan. 1991, 6 pages.

(56) References Cited

OTHER PUBLICATIONS

Pp. 5 and 6 of Deaton's specification, containing Deaton's admissions of the content of the prior art, and of the content of the prior art Goldman system.
Program of "Profitable Trade Promotion Programs," The Marketing Institute, Sep. 11 & 12, 1998.
Sakamoto, English abstract of Japanese document 58-178475 Oct. 1983.
Second declaration of Gary Katz, Dec. 30, 1998, 32 pages.
Second Declaration of Roy Van Denburgh, Dec. 30, 1998, 8 pages.
Shiono, English abstract of Japanese document 58-155475 Sep. 1983.
Shiyudou, English abstract of Japanese document 59-184965 Oct. 1984.
Survey—FT It Review by Tom Foramski; Financial Times dated Jul. 7, 1999, 2 pages.
Suzaki, English abstract of Japanese document 55-47560 Apr. 1980.
Takagi, English abstract of Japanese document 52-16941 Aug. 1993.
Takahashi, English abstract of Japanese document 59-94166 May 1984.
Takano, English abstract of Japanese document 56-27468 Mar. 1981.
Targeted Marketing Article—"Bar Codes Capture Info," Jan. 1989, 2 pages.
The title page, copyright page, and p. 120 (containing a definition of "database") of the First Computer Dictionary, 1974.
The title page, copyright page, and p. 126 (containing a definition of "database") of the Second Computer Dictionary, 1983.
The title page, copyright page, and p. 202 (containing a definition of "file") of the Second Computer Dictionary, 1983.
The title page, copyright page, and p. 237 (containing the definition of a computer) of Merriman-Webster's Collegiate Dictionary, Tenth Edition, 1996.
The title page, copyright page, and p. 266 (containing the definition of a coupon) of Webster's Collegiate Dictionary, Tenth Edition, 1995.
The title page, copyright pate, and p. 685 (containing the definition of "prospective") of Webster's Seventh New Collegiate Dictionary (1967).
The title, copyright page, and p. 332 (containing the definition of "coupon") of the Second College Edition of The American Heritage Dictionary, copyright 1985.
Third Declaration of Gary Katz—supports O'Brien oppositions to Deaton motion Nos. 1-17, Feb. 18, 1999, 85 pages.
Third Declaration of Roy Van Denburgh—supports O'Brien oppositions to Deaton motion Nos. 1-17, Feb. 18, 1999, 66 pages.
U.S. Appl. No. 09/354,263, entitled "Point-of-Sale Server and Method," inventor(s) Deaton et al., Jul. 15, 1999.
Vision Value Club Brochure, 16 pages.
Written Opinion dated Jan. 31, 1996 for Application No. PCT/US94/08221, filed Jul. 21, 1994, 5 pages.

Amato-McCoy, Deena, "Bruno's Sets POS Update In 100 Units; Eyes Internet," J. Supermarket News, v. 47, n. 8, beginning at p. 19, Fairchild Publications, Inc., Jun. 24, 1997.
Amato-McCoy, Deena, "Level's Hikes Profit Through Automated Pricing," J. Supermarket News v. 48, n. 3, p. 18, Fairchild Publications, Inc., Jan. 18, 1999.
Amato-McCoy, Deena, "Open POS System Is Rolling Out At Harvey's," J. Supermarket News, v. 48, n. 1, beginning at p. 13, Fairchild Publications, Inc., Jan. 5, 1998.
Amato-McCoy, Deena, "Real-time Price Data From United Goes On-Line," J. Supermarket News, v. 48, n. 22, p. 21, Fairchild Publications, Inc., Jun. 1, 1998.
Guttman, Robert H. et al., "Agent-mediated Integrative Negotiation for Retail Electronic Commerce," *Selected Papers from the First International Workshop on Agent Mediated Electronic Trading on Agent Mediated Electronic Commerce*, 1998.
Hammell, David G., "An Economic Electric Point-of-Sale-Updating System," ACM National Meeting, 1966.
Hu, Jungling et al., "Online Learning about Other Agents in a Dynamic Multiagent System," International Conference on Autonomous Agents, 1998.
Huff, Robert, "System Characterization of a Retail Business System," Conference on Simulation, Measurement, and Modeling of a Computer Systems, 1979.
Lee, Ho-Guen, "Do Electronic Marketplaces Lower the Price of Goods," Communications of the ACM, 1998.
Mactavish, Thomas J. et al., "The NCR Human Interface Technology Center," Conference on Human Factors in Computing Systems, CHI, 1997.
"New England Grocers Fight For ESL Rights," J. Chain Store Age Executive with Shopping Center Age, v. 74, n. 9, beginning at p. 110, Lebhar-Friedman Inc., Sep. 1998.
Petersen, Laurie, "Catalina Launches Two New Coupon Programs," Adweek, Nov. 12, 1990 (printout of online version, 1 sheet).
"Retailer rings up quick response," Communications News, v. 34, n. 3, p. 61, Nelson Publishing, Mar. 1997.
"Rite Aid tests electronic shelf label system," Drug Store News, v. 21, N. 8, p. 33, May 17, 1999.
"Symbol Provides RF LAN to Ace," J. Wireless Week, p. 22, Reed Business Information, Sep. 30, 1996.
Tesauro, Gerald J. et al., "Foresight-based pricing algorithms in an economy of software agents," International Conference on Information and Computer Economies, 1998.
Tonn, Maureen, "Marketing One-on-One," J. Supermarket News, v. 48, n. 51, p. 14,16, Fairchild Publications, Inc., Dec. 21, 1998.
Wellman, Michael P., "A Market-Oriented Programming Environment and its Application to Distributed Multicommodity Flow Problems," Journal of Artifical Intelligence, 1993.
Zimmerman, Denise, "Electronic Sticker Shock," J. Supermarket News, v. 45, n. 38, beginning at p. 17, Fairchild Publications, Inc., Sep. 18, 1995.

\* cited by examiner

POINT-OF-SALE SERVER AND METHOD

CROSS-REFERENCE TO RELATED APPLICATIONS

This application is a continuation of U.S. application Ser. No. 09/360,820, filed Jul. 26, 1999, entitled "POINT-OF-SALE SERVER AND METHOD", by DEATON et al., now U.S. Pat. No. 6,993,498, issued Jan. 31, 2006, which is a continuation of U.S. application Ser. No. 09/354,263, filed Jul. 15, 1999, entitled "POINT-OF-SALE SERVER AND METHOD," by DEATON et al., now abandoned, both of which are herein incorporated by reference in their entireties.

BACKGROUND OF THE INVENTION

1. Field of the Invention

This invention relates generally to marketing and more particularly to a point-of-sale server and method.

2. Background Art

Market surveys and research provide a manufacturer with information that it may use to respond to changing market conditions. For example, surveys may be conducted which ask consumers whether they favor a particular product over another. In addition, the actual past sales of a manufacturer's product may be compiled and analyzed.

Although some product information is available from these techniques, relying on conventional techniques for assessing one's place in the market may provide less than satisfactory results. For example, by the time market research informs a manufacturer that his product is underperforming in a particular market, the manufacturer may not have time to appropriately respond. Furthermore, temporary market conditions may affect the purchase of a particular manufacturer's product or its competitor's products, and these temporary conditions may no longer be applicable by the time conventional market research analysis is completed.

U.S. Pat. No. 4,972,504, entitled "Marketing Research System and Method for Obtaining Retail Data on a Real-Time Basis" to James N. Darrel, Jr., is exemplary of prior retail store marketing systems. The patent describes a system that stores retail data on a real-time basis and subsequently provides information remotely. The described system does not, however, communicate the data to a remote location, on a substantially real-time basis, allowing manufacturers or other clients to respond to market conditions rapidly; nor does the described system enable rapid response back to the point-of-sale to vary marketing parameters.

SUMMARY OF THE INVENTION

Accordingly, a need has arisen for an Internet point-of-sale server and method that addresses the shortcomings of prior methods and apparatuses.

According to one embodiment of the invention, a method for use in marketing includes detecting, at the point-of-sale, a plurality of Uniform Product Codes associated with respective items purchased by a customer and transmitting, on a substantially real-time basis, the plurality of Uniform Product Codes over the Internet to a remote computer connected to the Internet.

According to another embodiment of the invention, a system for use in marketing includes an electronic cash register for processing items at the point-of-sale. The system also includes a computer remote from the point-of-sale and connected to the Internet. The system also includes a substantially real-time communication link operable to carry information associated with the items from the point-of-sale to the Internet on a substantially real-time basis for receipt by the computer.

Embodiments of the invention provide numerous technical advantages. For example, in one embodiment of the invention, a manufacturer is provided access to real-time product purchase information. This real-time access allows the manufacturer to respond appropriately to market condition. For example, a manufacturer may effect a price reduction in stores of products that are being purchased in less than desired quantities. In addition, a manufacturer may provide customer incentives, such as redeemable coupons, on a real-time basis to particular customers identified to the manufacturer through substantially real-time purchasing data. Such an ability allows a manufacturer, for example, to market its products to purchasers of competing products.

According to another embodiment of the invention, a manufacturer is able to receive product information associated only with its products and with its competitors products to assess the manufacturer's position in the market. According to another embodiment, a manufacturer may respond to market conditions by automatically communicating a price change through the Internet to the cash register or to electronic shelf tags located in retail stores. Another embodiment of the invention allows a manufacturer to effect a credit to a retail store for reducing the price of a manufacturer's product. Such automatic crediting facilitates the retail store's role in changing the retail price on the manufacturer's products and allows a manufacturer to market its products based upon the product's performance in the marketplace. According to another embodiment of the invention, a customer may submit a shopping list and receive price information associated with the shopping list from a plurality of different stores. Such reception, allows a customer to, from the customer's home, comparison shop and select an appropriate store from which to actually purchase the desired products.

Other technical advantages are readily apparent to one skilled in the art from the following figures, descriptions and claims.

BRIEF DESCRIPTION OF THE DRAWINGS

For a more complete understanding of embodiments of the invention and the advantages thereof, reference is now made to the following descriptions taken in connection with the accompanying drawings in which.

DETAILED DESCRIPTION OF THE INVENTION

Embodiments of the invention and their advantages are best understood by referring to FIGS. 1-12 of the drawings, like numerals being used for like and corresponding parts of the various drawings.

Figure 1:
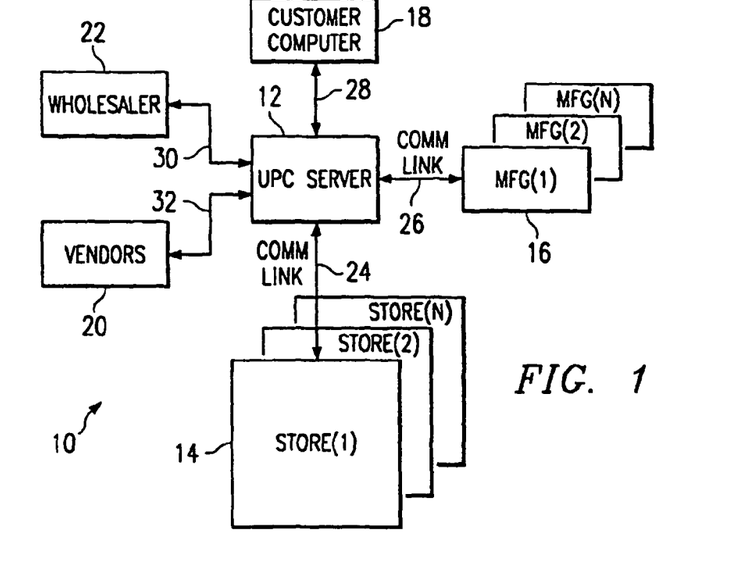
FIG. 1 is a block diagram of a system for providing point-of-sale information to a manufacturer.

FIG. 1 is a block diagram of a system 10 for providing point-of-sale information to a manufacturer 16. System 10 includes a UPC server 12 connected to one or more stores 14 by a communication link 24. System 10 also includes one or more manufacturers 16 connected to UPC server by communication link 26. In addition to manufacturers 16, vendors 20 and wholesalers 22 may also be connected to UPC server 12 by communications links 32 and 30, respectively. Vendors 20, wholesalers 22, manufacturers 16, competing retailers 14, or any other entity that subscribes to the services offered by UPC server 12 may be referred to herein as clients. System 10 also includes a customer computer 18 for accessing UPC server 12 via communication link 28. According to one embodiment of the invention, communications links 24, 26, 30, and 32 utilize the Internet.

According to the teachings of the invention, point-of-sale information obtained at store 14 is communicated on a substantially real-time basis to UPC server 12. Such point-of-sale information may include UPC codes for purchased products, UPC codes for redeemed coupons, prices of purchased products, other suitable identifications of purchased products, and other suitable data obtained at the point-of-sale, including codes not currently used. Additional point-of-sale information may include a store identification such as an Internet address, the register or lane number, and additional data such as lines of print sent to the receipt tape, smart card contents, customer IDs, and receipt lines including item description, quantity, and price, and receipt total. The entire contents of a customer's smart card may also be provided to UPC server 12. In addition, payment instrument data such as credit card number, check number, and debit card number may be transferred. Such numbers may be used as unique customer identification codes for identifying particular customers. The identification of particular customers allows determining what products a particular customer purchases, which may be used in marketing.

The communicated information is then made available on a substantially real-time basis to manufacturers 16, vendors 20, wholesalers 22, and other appropriate clients. By providing point-of-sale information on a substantially real-time basis, manufacturers 16, vendors 20, and wholesalers 22 may respond to the purchase or non-purchase of goods or services associated, respectively, with manufacturers 16, vendors 20, and wholesalers 22. For example, a manufacturer 16 may receive point-of-sale information indicating a market share far below their normal market share. In such a case, manufacturer 16 may instantly lower prices on its goods to be more competitive.

Furthermore, a manufacturer 16 may offer, on an individualized basis, incentives to a customer of store 14 based upon the customers past purchasing history, purchases made in a current transaction, a combination of these purchases, or regardless of the purchases of the customer. By providing point-of-sale information on a substantially real-time basis to, for example, manufacturer 16, individualized customer incentives may be provided by the manufacturer.

Figure 2A:
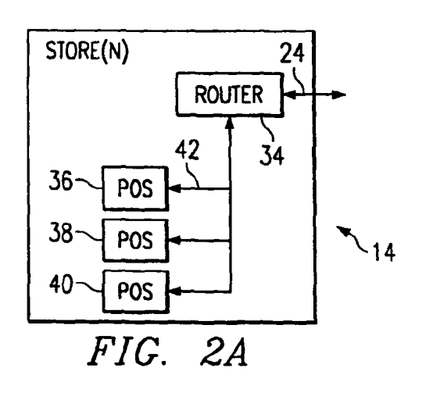
FIG. 2A is a block diagram of a store showing details of a portion of the system of FIG. 1 for providing information from the point-of-sale to a manufacturer.

FIG. 2A is a block diagram of store 14 showing details of a portion of the system of FIG. 1 for providing information from a point-of-sale 36, 38, and 40 to a manufacturer 16. Store 14 includes a plurality of points-of-sale 36, 38, and 40. Each of the points-of-sale is connected to a router 34 via a communication link 42. Router 34 receives information from each of the points-of-sale 36, 38, and 40 on a substantially real-time basis and directs such information, on a substantially real-time basis, over communication link 24 to UPC server 12, illustrated in FIG. 1. Points-of-sale 36, 38, and 40 are described in greater detail below in conjunction with FIG. 3.

Figure 2B:
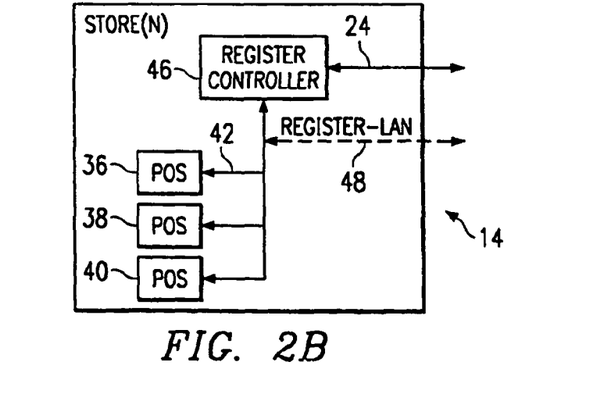
FIG. 2B is a block diagram of a store showing alternative details of a portion of the system of FIG. 1 for providing point-of-sale information to a manufacturer.

FIG. 2B is a block diagram of a store 14 showing alternative details of a portion of system 10 for providing point-of-sale information to manufacturer 16. In this embodiment of store 14, router 34, and incentive controller 44 are replaced with a register controller 46. In this embodiment, register controller 46 operates to provide information to points-of-sale 36, 38, and 40 related to product prices and descriptions and, in addition, transmits point-of-sale information to manufacturers 16 over communication link 24. In addition, register controller 46 receives information from manufacturers 16 for delivery to the customer at the points-of-sale 36, 38, 40. Such an embodiment incorporates the design of register controller 46 for reception of information from manufacturers 14 according to some standard protocol. Alternatively, a register local area network 48 may be tapped into and point-of-sale information may be provided to manufacturers 16 without designing register controller according to a particular protocol.

Figure 2C:
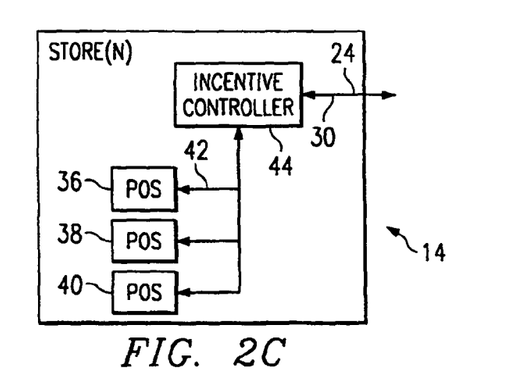
FIG. 2C is a block diagram of a store showing alternative details of a portion of the system of FIG. 1 for providing point-of-sale information to a manufacturer.

FIG. 2C is a block diagram of store 14 showing alternative details of a portion of system 10 for providing point-of-sale information to a client, such as manufacturer 16. In this embodiment of store 14, router 34 is replaced with an incentive controller 44. Incentive controller 44 receives point-of-sale information directly from points-of-sale 36, 38, and 40 on a substantially real-time basis-over, for example, communication link 42. Incentive controller 44 then transmits the point-of-sale information on a substantially real-time basis over communication link 24 to UPC server 12. Alternatively, incentive controller 44 is associated with points-of-sale 36, 38, 40, but store 14 communicates with UPC server 12 through other means.

Whether or not connected to UPC server 12, incentive controller 44 may provide incentives, such as redeemable coupons or a written notification of a future product discount or advertising message, to customers at points of sale 36, 38, 40, recommend such incentives to manufacturer 16, or process incentives generated by manufacturer 16. Incentive controller 44 may also be used in validating product purchases in conjunction with products offered at a discount or for products for which coupons are redeemed. Incentive controller 44 may generate incentives based upon a customer's past purchasing history, a customer's present purchases, a combination of these two, or other suitable techniques.

Exemplary methodology for generating incentives by incentive controller 44 is described in U.S. Pat. No. 5,687,322 to Deaton et al., which is incorporated herein by reference and in U.S. patent application Ser. No. 09/320,114 to Deaton et al., entitled Method and System for Providing Customer Incentives Utilizing Dual Customer Identifications, which is incorporated herein by reference for all purposes. Incentive controller 44 may be formed integral with a register controller used by store 14 (not explicitly shown in FIG. 2C) that controls registers associated with each point-of-sale. For example, the register controller may provide each individual register information associating each bar code with a description and associated price.

Figure 2D:
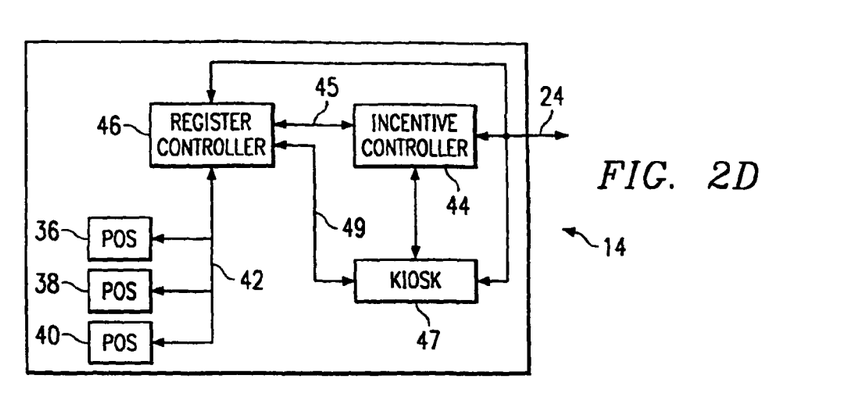
FIG. 2D is a block diagram of a store showing alternative details of a portion of the system of FIG. 1 for providing point-of-sale information to a manufacturer.

FIG. 2D is a block diagram of store 14 showing alternative details of a portion of system 10 for providing point-of-sale information to a client, such as manufacturer 16. In this embodiment, store 14 includes a kiosk 47. Kiosk 47 allows a customer of store 14 to view and select incentives available to the customer. Details of one example of kiosk 47 are described in greater detail in conjunction with FIG. 4B. In the illustrated embodiment, kiosk 47 is connected to UPC server 12 by communication link 24; however, a kiosk may be utilized that is either not connected to UPC server 12 or that is indirectly connected to UPC server 12 through another element at store 14. Register controller 46 and incentive controller 44 are also illustrated in FIG. 2D. Register controller 46 is connected to kiosk 47 by a communication link 49. Incentive controller 44 is connected to kiosk 47 by communication link 51.

According to the teachings of the invention, point-of-sale information is communicated through communication link 24 to UPC server 12. Such information is then communicated to a manufacturer 16. In response to receiving information from the point-of-sale, manufacturer 16 may communicate, through UPC server 12, incentives to be communicated to a customer of store 14. Kiosk 47 provides a way for the incentive to be communicated to the customer.

Kiosk 47 receives an incentive over communication link 24. A customer entering store 14 may proceed to kiosk 47 to determine what incentives are available. Kiosk 47 may then provide the customer a printed redeemable coupon or communicate a future electronic discount. In the case of a printed redeemable coupon, a coupon is distributed by kiosk 47 that may be redeemed at point-of-sale 36, 38, 40. In the case of a future electronic discount, the customer is identified at kiosk 47 by, for example, a customer loyalty card, a smart card, a credit card, a debit card, or other method of identification. After identification, an incentive available to the customer is communicated to the customer by, for example, printing of the incentive on a viewable screen or on a printer. In addition to communicating the future electronic discount to the customer, kiosk 47 communicates the future electronic discount to incentive controller 44 for application when the customer is identified at point-of-sale 36, 38, 40 and the customer purchases the product associated with the future electronic discount. As an alternative, kiosk 47 may communicate incentives available to all customers, as opposed to particularly identified customers, in which case communication of individual electronic discounts to incentive controller 44 is unnecessary.

It should be understood that although a particular configuration of store 14 is illustrated in FIG. 2D, other configurations may be utilized, including combining register controller 46 and incentive controller 44 into a single integrated device, combining incentive controller 44 and kiosk 47 into a single integrated device, and eliminating redundant communication links. For example, according to one embodiment, kiosk 47 and register controller 46 may be connected to UPC server 12 solely through incentive controller 44, and register controller 46 may be connected to kiosk 4,6 solely through incentive controller 44.

Figure 3:
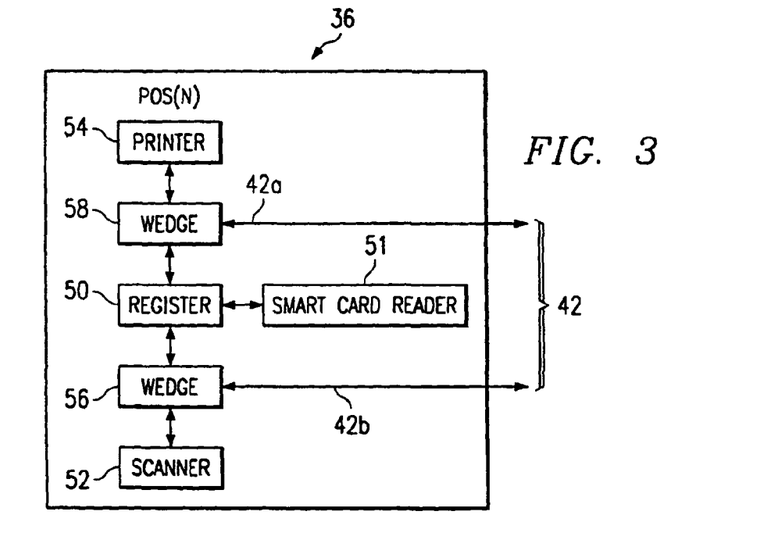
FIG. 3 is a block diagram of the points-of-sale illustrated in FIGS. 2A, 2B, and 2C showing additional details of one embodiment of a point-of-sale.

FIG. 3 is a block diagram of particular examples of points-of-sale 36, 38, and 40 illustrated in FIGS. 2A, 2B, and 2C showing additional details of one embodiment of a point-of-sale 36. Although point-of-sale 36 includes a particular collection of items, "point-of-sale" as used herein below without a reference numeral refers to the general location at which products are purchased. Point-of-sale 36 includes an electronic cash register 50. Electronic cash register 50 receives a signal indicative of the bar code of an item scanned by a scanner 52. A scanned item may include a product for purchase, a coupon being redeemed, or other suitable item bearing a scannable code. Based upon the signal indicative of the UPC bar code, a price is associated with the scanned item as well as a description of the scanned item. The price of the item and the description are printed on a printer 54. The price and description of an item are associated with a scanned bar code through communication of register 50 with a register controller (not explicitly controlled). In the case of a single point-of-sale 36, register 50 may itself maintain a database associating bar codes with related price and product descriptions.

Between scanner 52 and register 50 is a wedge 56. Wedge 56 intercepts information from scanner 52 and provides it along communication link 42B to router 34. A wedge allows a single signal to be split into multiple signals for receipt by multiple devices or, either alternatively or in combination, allows a signal to be inserted onto an existing communication link. An example of wedge 56 is an RS-232 Y-cable used to enable two devices, for example computers, to share a single serial device; however, other suitable wedges may be utilized. Therefore, by providing a signal indicative of the bar code of a scanned item, wedge 56 allows generation of information describing products and coupons scanned at the point-of-sale. Similarly, a wedge 58 disposed between register 50 and printer 54 receives information from register 50, allowing transmission of information along communication link 42A describing price and product information.

In addition to providing point-of-sale information, wedges 56 and 58 may receive information generated by manufacturers 16 for providing to a customer at point-of-sale 36, such as customer incentives. For example, a manufacturer may offer a customer a coupon for a product in response to the customer's purchase of particular products. Upon receiving information describing the customer's purchase, manufacturer 16 may provide a signal through point-of-sale server 12 directed for a customer utilizing point-of-sale 36. Communication link 42A may carry such a signal to wedge 58 and it may be printed on printer 54, informing the customer of the incentive. Alternatively, a separate printer or a monitor at the point-of-sale may be used to communicate incentives to customers.

A smart card reader 51 may be connected to register 50. Smart card reader 51 receives a smart card storing an identification of a customer. The smart card also includes a memory for storing awards. Thus, through smart card reader 51, awards may be generated and applied at point-of-sale 36, 38, 40.

Figure 4A:
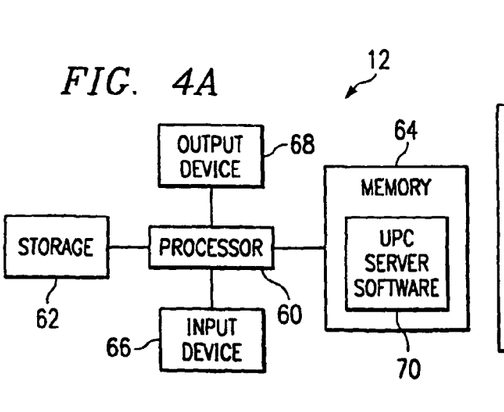
FIG. 4A is a block diagram of the UPC server illustrated in FIG. 1.

FIG. 4A is a block diagram of one example of UPC server 12. UPC server 12 may be implemented in many forms. In the example illustrated in FIG. 4A, UPC server 12 includes a processor 60 associated with a storage device 62 and a memory device 64. Processor 60 may also be associated with an input device 66 and an output device 68.

Memory 64 includes UPC server software 70. UPC server software 70 may be executed by processor 60 while stored in memory 64. Alternatively, UPC server software may be executed from storage area 62. UPC server software 70 contains software coding sufficient to execute functions performed by UPC server 12 described in greater detail below. UPC server 12 may also be implemented in various other forms, including the use of ASICs or other hardware configurations.

Figure 4B:
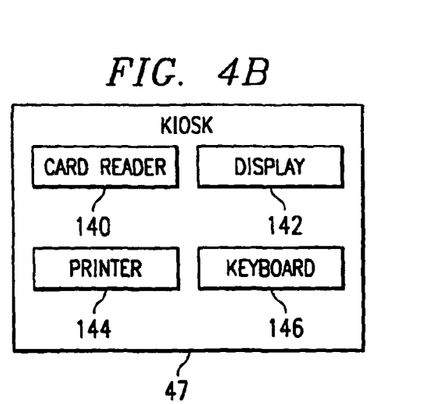
FIG. 4B is a block diagram of one embodiment of the kiosk of FIG. 2D.

FIG. 4B is a block diagram illustrating one embodiment of kiosk 47. In the illustrated embodiment kiosk 47 includes a card reader 140, a display 142, a printer 144, and a keyboard 146; however, other suitable kiosks may be used. For example, kiosk 47 may include a separate smart card reader for receiving a smart card.

Display 142 may communicate incentives and provide additional information to a customer. Display 142 may be a touch-sensitive screen for receiving information from the customer, such as information related to which incentives the customer desires. Keypad 146 also allows a customer to provide information to kiosk 47. For example, a customer may provide a name, address, telephone number, or other suitable indication of the customer's identity. Card reader 140 may also be used to identify a customer by receipt of a customer card, credit card, debit card, or other instrument from which the customer's identity may be determined. Printer 144 may be used in conjunction with display 142 to generate a shopping list of items for which the customer will receive discounts when the items are purchased. Kiosk 47 may be used in conjunction with distribution of incentives as described above in conjunction with FIG. 2D.

Figure 5:
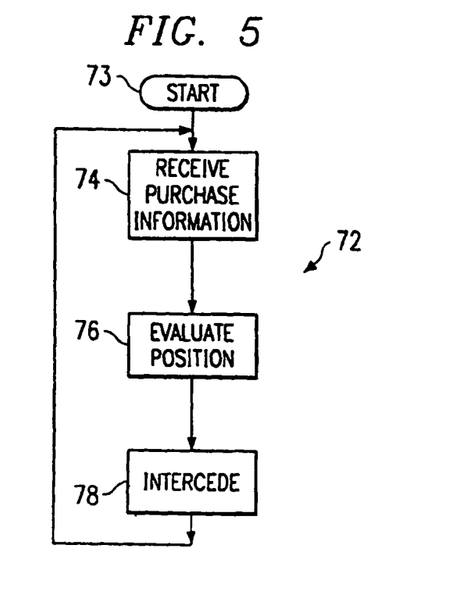
FIG. 5 is a flow chart illustrating a summary of steps performed in conjunction, with the system of FIG. 1 to allow a plurality of manufacturers to market their products to customers.

FIG. 5 is a flow chart illustrating a summary of steps performed in conjunction with system 10 to allow a manufacturer 16 to market its products to customers of store 14. The process begins at a step 73. At a step 74, manufacturer 16 receives point-of-sale purchase information from UPC server 12. Point-of-sale purchase information is provided to UPC server 12 from store 14 through communication link 24. According to one embodiment, communication link 24 provides Internet access to store 14 and therefore, connects UPC server 12 to store 14 via the Internet. According to the embodiment illustrated in FIG. 2A, such point-of-sale information is provided from individual points of sale 36, 38, 40 to a router 34 for transmission along communication link 24. In the embodiment illustrated in FIG. 2B, such point-of-sale information is provided by points of sale 36, 38, and 40 to an incentive controller 44, for communication over communication link 24 to point-of-sale server 12. In the embodiment illustrated in FIG. 2C, such point-of-sale information is provided by points of sale 36, 38, and 40 to either a register controller 46 for communication over communication link 20 to UPC server 12, or by eavesdropping by UPC server 12 on a register local area network 48 associated with store 14. In each of the above embodiments, according to one example system, each of the points of sale 36, 38 and 40 provide information to respective controllers or to UPC server 12 through the use of wedges, such as wedges 56 and 58. According to another example system, wedges 56, 58 are not utilized and product purchase information is obtained from a register controller, such as register controller 46, incentive controller 44, or from register LAN 48.

After point-of-sale information is received by UPC server 12, point-of-sale information is transmitted on a substantially real-time basis over communication link 26 to manufacturer 16. In the embodiment illustrated in FIG. 1, communication link 26 is an Internet connection between manufacturers 16 and UPC server 12; however, other suitable connections may be established including satellite links, wireless communications, phone lines, and dedicated lines. At a step 76, manufacturer 16 may evaluate the point-of-sale information it has obtained from UPC server 12. Evaluation of such information may allow a manufacturer 16 to assess whether its products are selling according to desired parameters. For example, a manufacturer may assess the market share of a particular product in a particular geographic region.

After evaluating the position of its products at step 76, a manufacturer may intercede at step 78 to attempt to effect increased purchases of the manufacturer's products at step 78. Such intercession may take a variety of forms. For example, manufacturer 16 can initiate offers to customers by e-mail, can initiate offers through the use of kiosks conventionally located in stores such as retail stores, can initiate offers for immediate communication at the point-of-sale, can communicate notification of a future electronic discount at the point-of-sale, manufacturer 16 may take other applicative action.

Generation of such incentives may include the methodology described in U.S. Pat. No. 5,687,322 to Deaton et al, including generating incentives based on the purchases of a customer, including examination of the products purchased by the customer in past and/or present transactions or the customer's economic impact on manufacturer 16, as measured by the volume of purchases by a particular customer. Such volume may be measured by dollar amount or other suitable criteria. Generation of incentives to individual customers may also be performed without reference to the market position of any particular product of a manufacturer 16. In each of these examples, UPC server 12 may act as an intermediary to maintain privacy concerns of particular individuals shopping at store 14. Thus, UPC server 12 can block, or prevent, providing of any of these types, of offers to the customer. UPC server 12 may act as an intermediary by maintaining, and not providing to manufacturer 16, information that would allow manufacturer 16 to determine the identity of any individual. For example, e-mail addresses and physical addresses may be maintained only by UPC server 12 and not provided to manufacturers 16.

In addition to providing incentives to the individual customers, a manufacturer 16 may intercede by, in response to assessing its position in the market on a substantially real time basis, effect a price change in particular products. Such a price change may be effected through traditional techniques or may utilize UPC server 12 to communicate to retail store 14, that the manufacturer 16 is implementing a price reduction. Such price reduction could include an automatic discount on the selling price at store 14, which would be subsidized by manufacturer 16, or may involve a direct discount to the retail store with a subsequent price change in the selling price at the store 14 determined by the operator of store 14.

Furthermore, a manufacturer may communicate incentives to customers independent of the current market position of its products. Information that may be transmitted to store 14 by UPC server 12 may include electronic discounts, lines of print for the register printer or an auxiliary printer for communication of messages to the customer, information sent back for writing to the customer's smart card to update things such as point totals, purchase profiles, etc. Demographics may also be introduced to provide real-time purchase data based on national, regional, state, city, neighborhood, and even store levels. Purchases by identified customers may be presented to manufacturers based on, for example, customer's total spending levels; customer's level of spending on that manufacturer's products; customer's level of spending on competitor's products; customer's level of spending on a department, product class, or product family; and customer's level of spending on complimentary or companion products, and other customer data such as size of the household, household income, etc.

The flow of information from UPC server 12 to any individual manufacturer 16 may be based upon particular information subscribed to by manufacturer 16. For example, a particular manufacturer 16 may wish to receive only information regarding the purchase of the manufacturer's products and the purchase of the manufacturer's competitor's products. Thus, UPC server 12 may perform a filtering function in which only subscribed to data is transmitted to any particular manufacturer 16. Such filtering is described in greater detail below in conjunction with FIG. 6.

Figure 6:
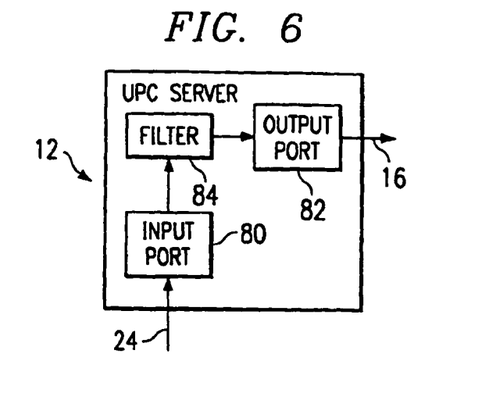
FIG. 6 is a block diagram illustrating an example server of the system of FIG. 1, showing units for receiving information, filtering that information, and distributing the filtered information to appropriate manufacturers.

FIG. 6 is a block diagram illustrating additional details of one example of UPC server 12 showing UPC server 12, showing units for receiving information, filtering that information, and distributing the filtered information to appropriate manufacturers 16. In the illustrated embodiment, UPC server 12 includes an input port 80 and an output port 82. Input port 80 represents circuitry and any associated software utilized to receive point-of-sale information from store 14 over communication link 24. Thus, although a limited number of stores 14 are illustrated in FIG. 1, input port 80 may be configured to receive point-of-sale information for all stores associated with UPC server 12. The point-of-sale information received by input port 80 is provided to filter 84. Filter 84 contains circuitry and/or software that identifies the type of point-of-sale information and associates that type of point-of-sale information with particular subscribing manufacturers 16. Such information is provided to an output port 82 for transmission to a particular manufacturer 16. By providing filtering capabilities, UPC server 12 alleviates a manufacturer 16 from having to process large amounts of information that is unrelated to the manufacturer's business.

Figure 7:
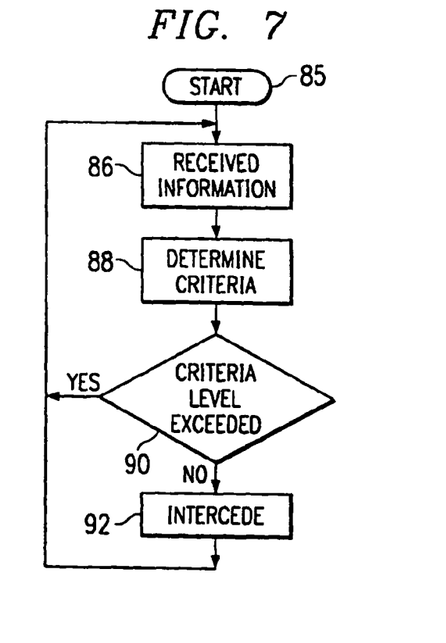
FIG. 7 is a flow chart illustrating automatic response by a manufacturer in response to the meeting of certain thresholds relating to the manufacturer's products.

FIG. 7 is a flow chart illustrating the automatic response by a manufacturer 16 in response to the meeting of certain thresholds relating to the manufacturer's products. The process begins at step 85. At a step 86, information is received by manufacturer 16 as described above relating to a particular product. At a step 88, it is determined what criteria will be applied to assessing the position of the manufacturer's products. For example, the market share of the particular product may be the criteria used. As another example, the volume of sales of a particular product may be used as a criteria. As a third example, the relative pricing of the particular product in comparison to its competitor may be used as a criteria. Furthermore, changes in each of these criteria over a particular period of time may be used as a criteria. For simplicity of description, a market share criteria is adopted for the remainder of this example. A market share of 25% is considered desirable and a market share of less than 25% is considered undesirable.

At a step 90 a determination is made of whether the criteria level is exceeded. In this example, if the market share of the particular product manufactured by manufacturer 16 has a market share greater than 25%, a manufacturer 16 is satisfied and continues to receive information to remain abreast of the success of the manufacturer's product. If the market share is less than 25% then intercession is required at step 92, and manufacturer 16 utilizes one of many available options for attempting to increase the criteria level, which in this case is market share. By having the opportunity to receive information on a substantially real-time basis regarding product pricing and purchases, manufacturers 16 may intercede in a timely fashion in a manner not otherwise available.

Figure 8:
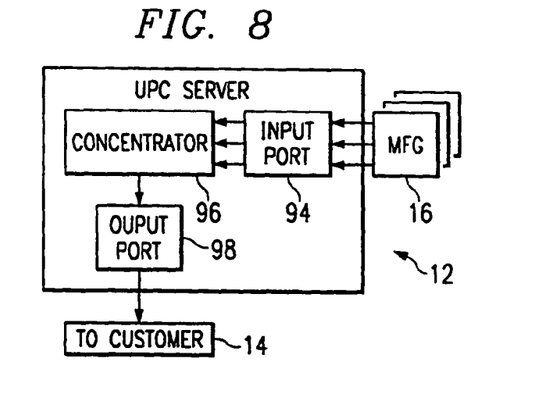
FIG. 8 is a block diagram of an example UPC server containing circuitry and/or software operable to concentrate e-mails provided by a plurality of manufacturers for receipt by a customer of a store.

According to another aspect of the invention, UPC server 12 operates to concentrate messages received from manufacturer 16 for delivery to customers of store 14. In order to effect the purchase of a manufacturer's product, manufacturer 16 may desire to provide incentives to customers of store 14, such as coupons or e-mails. According to one embodiment, UPC server 12 includes circuitry and/or software 70 that operates to concentrate promotional messages into a common e-mail so that customers of store 14 are not inundated with a plurality of undesired promotional e-mails. According to this embodiment, manufacturer 16 transmits a promotional e-mail to UPC server 12 for receipt by a particular customer of store 14. Manufacturer 16 identifies the customer of store 14 by some sort of identification number. UPC server 12 also receives a plurality of other promotional messages for receipt by the same customer of store 14, but from different manufacturers 16. UPC server 16 consolidates these e-mails into a common e-mail that is sent to an e-mail address known by UPC server 12 but not by manufacturers 16. This process helps maintain the privacy of the customer of store 14 and also reduces the number of e-mails received by the customer.

FIG. 8 is a block diagram of an example UPC server 12 containing circuitry and/or software operable to concentrate e-mails provided by a plurality of manufacturers 16 for receipt by a customer of a store 14. In this embodiment, UPC server 12 includes an input port system 94 for receiving a plurality of e-mails from a plurality of manufacturers 16. These e-mails are provided to a concentrator system 96. Concentrator system 96 consolidates a plurality of e-mails destined for a common user into a common e-mail message. This common e-mail message is provided to output port system 98, which in turn transmits the common e-mail to a customer of store 14. In this manner, UPC server 12 also operates to facilitate transmission of promotional messages to the customer, in addition to providing a means of communication of point-of-sale data to a manufacturer on a substantially real-time basis.

Figures 9, 10, 11:
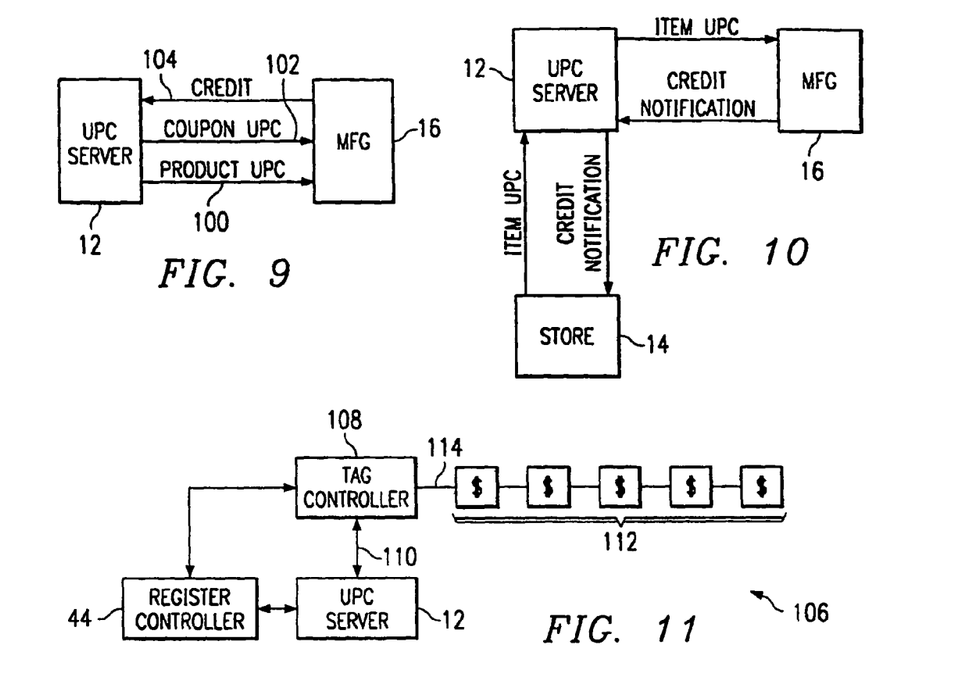
FIG. 9 is a block diagram illustrating the use of a UPC server in facilitating coupon redemption validation and electronic crediting.
FIG. 10 is a block diagram showing an additional embodiment of the invention in which a UPC server facilitates electronic settlement of credit and debits between a store and a manufacturer.
FIG. 11 is a block diagram of a system for remotely effecting a product price change in a retail store.

According to another aspect of the invention, UPC server includes circuitry and/or software for facilitating both coupon redemption validation and electronic settlement mechanisms for incentives offered by the manufacturer, as illustrated in FIG. 9.

FIG. 9 is a block diagram illustrating the use of UPC server in facilitating coupon redemption validation and electronic crediting. Traditionally, coupons are marked with a Uniform Product Code and thus, bar codes scanned from a coupon may also be provided to manufacturer 16 by UPC server 12 as indicated by arrow 102. Thus, manufacturer 16 is able to receive both the product Uniform Product Code and the Uniform Product Code associated with a coupon for that product. Therefore, the manufacturer may verify the proper redemption of a manufacturer coupon and provide an appropriate credit to store 14. Such redemption verification includes verifying that the product associated with the coupon is actually purchased. Verification may also include verifying the price at which the product was purchased. In addition, for incentives associated with a particular customer, the identity of the person receiving a discount may be verified. Alternatively, UPC server 12 may include circuitry and/or software 70 for also performing this validation and for providing manufacturer 16 of a summary of the number and amount of coupons redeemed for the particular manufacturer. In either event, once verified manufacturer 16 may effect a credit, demonstrated by arrow 104, directed to store 14 in the amount of the redeemed coupons.

FIG. 10 is a block diagram showing an additional embodiment of the invention in which UPC server 12 facilitates electronic settlement of credit and debits between store 14 and manufacturer 16. According to one aspect of the invention, manufacturer 16 may respond in a substantially real-time basis to market developments to attempt to adjust the relative market share of a manufacturer's product, or attempt to adjust to other market conditions to attempt to generate desirable product sales of the manufacturer's products.

One adjustment made by manufacturer 16 is the downward adjustment of price at which the manufacturer's product will be sold. Manufacturer 16 may effect such a downward adjustment in price by specifying to store 14 the price at which the store should sell the product and by granting a credit to the store 14 for each such product purchased. Such a method for adjusting to market conditions may require a settlement mechanism between manufacturer 16 and store 14 to account for the lower price offered by store 14 at the request of manufacturer 16. UPC server 12 therefore, may receive from store 14 Uniform Product Codes and the price information that is also transmitted to manufacturer 16. Manufacturer 16 may then be able to assess the number of its products sold at a discount and the amount of discount owed store 14. In response, manufacturer 16 may provide a credit notification through UPC server 12 for transmission to store 14, thus effecting electronic settlement of temporary price reductions offered by a manufacturer and implemented by a store. Such electronic settlement may also be utilized to compensate store 14 for redeemed coupons or application of other discounts effected at the initiative of manufacturer 16.

FIG. 11 is a block diagram of a system 106 for remotely effecting a product price change in a retail store. System 106 includes a tag controller 108 connected to a plurality of electronic tags 112 via a communication link 114. According to one embodiment, communication link 114 comprises an FM transmitter for transmitting to electronic tags 112 the price to be displayed on each individual electronic tag 112. According to another embodiment, communication link 114 comprises a suitable conductive transmission medium, such as electrical wires. The system also includes a UPC server 12 connected to tag controller 110 via a communication link 110. According to one embodiment, tag controller 108 is located in a store, such as store 14, that is connected to UPC server 12. According to the same embodiment, communication link 110 utilizes the Internet. Communication link 110 allows UPC server 12 to provide an updated price for an item, such as the manufacturer's product, in response to the determination by the manufacturer based on substantially real-time data that it would be desirable to effect a change in price of the manufacturer's product. UPC server 12 communicates a signal indicating such a change to tag controller 108. Tag controller then provides such a signal along communication link 114 to a particular electronic tag 112 associated with the manufacturer product. Electronic tags 112 may be positioned, on a shelf near the location of the product. UPC server 12 may also communicate the price change to store 14 so that store 14 may maintain for its own records the adjusted price and verify any credits provided by manufacturer 16.

Therefore, manufacturer 16 may remotely effect a price change in one of its products in response to the analysis of data regarding the sale of its products or its competitors products. In addition, tag controller 108 may also provide price information to UPC server 12 so that the price information received from points of sale 36, 38 and 40 may be verified against the prices displayed by the electronic tags 112 in store 14.

Further, UPC server 12 may communicate the price changes to register controller 46 to maintain consistency between electronic tags 112 and register controller 46. Alternatively, register controller 44 may communicate directly with register controller 44, with register controller 44 providing the price change to tag controller 108.

In addition to providing product purchase and price information at the point-of-sale to the manufacturer, UPC server 12 also allows access to customers of product purchase and pricing information.

Figure 12:
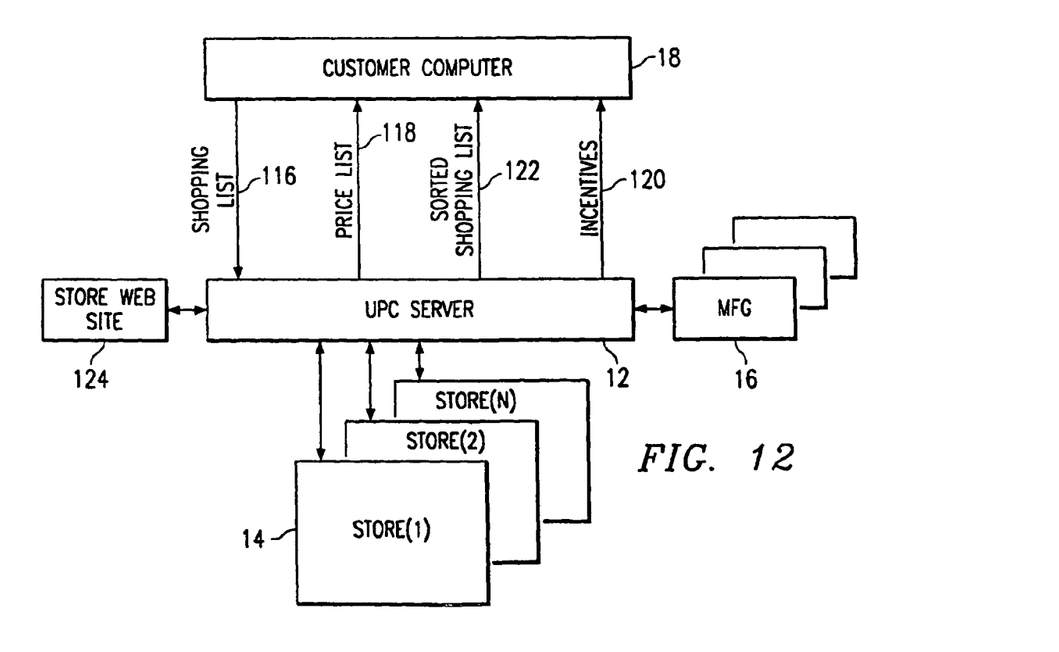
FIG. 12 illustrates a block diagram of a portion of the system of FIG. 1, showing the exchange of communication between a customer computer and a UPC server.

FIG. 12 illustrates a block diagram of a portion of system 10, showing the exchange of communication between customer computer 18 and UPC server 12. In this example, a user of customer computer 18 submits a shopping list to UPC server 12, as designated by arrow 116. In response, UPC server 12 submits a price list having the price of each item at each store 14 at which the user might shop, as designated by arrow 118. Therefore, by accessing UPC server 12, customers may determine at which store to shop for all items or for particular items. As an example, a customer selects one or more stores to price items and enters items to be priced. The customer's purchase history is used to aid the customer in selecting items for pricing. As items are presented for pricing, deals can optionally be presented to the customer that are based on items being priced. For example, Brand A paper towels is presented in the customer's list for pricing, so a deal that is stored for Brand B paper towels is presented to the customer. The prices for the customer's items are accessed from each store's item list and presented to the customer in total. One or more of the stores may have discount rates stored based on a customer's spending level. For example, the customer spends an average of $135.00 per week at Store A, and Store A has stored in its pricing table that any customer spending on average $75.00 or more per week would be presented with an incentive of 5% on purchases totaling $50.00 to $75.00 and 8% on purchase totals that exceed $75.00. This discount would be factored in and presented to the customer. The customer would then print out the shopping list stored by retail aisle for that particular store to facilitate shopping efficiency. Alternatively, the list could be processed for home delivery.

Further, discounts may be electronically stored on UPC server 12 or a web site 124 associated with store 14 for subsequent access by the customer. The electronic discounts may also communicate to store 14 for application when the customer is identified purchasing the product associated with the discount. Alternatively, the electronic discounts may be made available to customer in a printed format by allowing customer computer to download a redeemable coupon stored on either a store web site 124 or UPC server 12. The customer may then print the redeemable coupon on a printer associated with customer computer 18. Such a coupon may include a unique identification number that is available at store 14 to prevent unlawful duplication of redeemable coupons. Once a coupon having a unique identification number is redeemed, no other coupons having that same number will be redeemed. Alternatively, a manufacturer may communicate product discounts to store web site 124, through UPC server 12, for viewing by customers.

Furthermore, when shopping list 116 is submitted, UPC server may offer to one or more manufacturers 16 the opportunity to provide incentives to the particular customer submitting a shopping list. For example, manufacturer 16 may wish to offer incentives to such a customer, the content of the incentive being directed to the manufacturer's competing product for a product submitted in the shopping list. The providing of such incentives is illustrated by arrow 120. In addition, UPC server 12 may communicate a sorted shopping list, which may or may not include customer incentives, that is configured according to the placement of the various items in a particular store 14, as designated by arrow 122. Thus, the customer may receive an e-mail displaying a map of the aisles of the store with the products provided by the customer in the shopping list at 116 indicated in a location corresponding to the actual location of the particular product in the store 14. Therefore, a particular customer may be more likely to visit a store in which a shopping list is provided showing the particular location of each item the customer desires. For example, a shopper may actually be a spouse or friend of the underlying purchaser, and may not typically frequent a particular store. Therefore, having a list identifying the particular location at which each particular item is offered for sale may induce a customer to use the services of a particular store rather than a different store.

Although the present invention and its advantages have been described in detail, it should be understood that various changes, substitutions, and alternatives can be made therein without departing from the spirit and scope of the present invention as defined by the appended claims. For example, an embodiment of the invention has been described in the context of utilizing UPC codes; however, it is explicitly contemplated that the teachings of the invention may be incorporated with other types of codes representative of products, including existing codes and codes yet to be developed.

What is claimed is:

1. A method for processing point-of-sale information, the method comprising:
    receiving, by a computing device, from a point-of-sale terminal, an identifier associated with an item that has not yet been purchased by a customer;
    determining, by the computing device, point-of-sale information associated with the item based on a purchasing history, wherein the point-of-sale information includes:
        a price at which the item was previously purchased at a particular point-of-sale terminal,
        information identifying the item that was previously purchased and the particular point-of-sale terminal, and
        information identifying a previously applied incentive that was applied to the price;
    providing, by the computing device, the point-of-sale information associated with the item to a remote computer associated with a supplier of the item on a substantially real-time basis;
    providing, by the computing device, to the remote computer associated with the supplier of the item, purchasing information of a similar item associated with a competing supplier received from at least one store;
    receiving, by the computing device, an incentive from the remote computer associated with the supplier on a substantially real-time basis, wherein the incentive is determined based on at least the point-of-sale information associated with the item and the purchasing information of the similar item associated with the competing supplier received from the at least one store; and
    providing, by the computing device, the incentive to the point-of-sale terminal.

2. The method of claim 1, wherein the incentive includes a reduced price for the item.

3. The method of claim 2, further comprising:
    displaying the reduced price at a kiosk in a store or at the point-of-sale terminal.

4. The method of claim 1, wherein the incentive includes a redeemable coupon or discount associated with the item.

5. The method of claim 2, wherein the receiving the incentive is further determined based on at least performance of the item in a marketplace.

6. The method of claim 1, wherein the incentive is associated with a product from the supplier.

7. The method of claim 6, wherein the incentive includes a notification of a future discount associated with the product from the supplier.

8. The method of claim 6, wherein the incentive includes an advertisement of the product from the supplier.

9. The method of claim 6, wherein the incentive includes a coupon associated with the product from the supplier.

10. The method of claim 1, wherein the incentive is a redeemable coupon corresponding to a product from the supplier.

11. The method of claim 10, wherein the incentive includes a notification of a future discount associated with the product from the supplier.

12. The method of claim 10, wherein the incentive includes an advertisement of the product from the supplier.

13. The method of claim 10, wherein the incentive includes a coupon associated with the product from the supplier.

14. The method of claim 1, wherein the receiving an identifier includes receiving information indicative of a bar code associated with a redeemable coupon corresponding to a product from the supplier.

15. The method of claim 1, wherein the providing the point-of-sale information associated with the item includes providing the point-of-sale information via Internet.

16. The method of claim 1, further comprising:
    providing an identification of a customer to the supplier on a substantially real-time basis, wherein the receiving the incentive from the supplier is further determined based on at least the identification of the customer.

17. The method of claim 16, wherein the receiving the incentive includes receiving the incentive based upon a purchasing history of the customer.

18. The method of claim 16, further comprising:
    reading the identification of the customer from a smart card associated with the customer.

19. The method of claim 18, further comprising:
    storing the incentive on the smart card associated with the customer.

20. The method of claim 17, wherein the incentive is determined based on at least the purchasing history of the customer wherein the purchasing history includes at least purchase price information for a plurality of purchased items purchased by the customer.

21. An apparatus comprising:
    a processor; and
    a memory coupled to the processor, the memory storing instructions that, in response to execution by the processor, cause the processor to:
        receive, from a point-of-sale terminal, an identifier associated with an item that has not yet been purchased by a customer;
        determine point-of-sale information associated with the item based on a purchasing history, wherein the point-of-sale information includes:
            a price at which the item was previously purchased at a particular point-of-sale terminal, information identifying the item that was previously purchased and the particular point-of-sale terminal, and information identifying a previously applied incentive that was applied to the price;

provide the point-of-sale information associated with the item to a remote computer associated with a supplier of the item on a substantially real-time basis;

provide to the remote computer associated with the supplier of the item, purchasing information of a similar item associated with a competing supplier received from at least one store;

receive, an incentive from the remote computer associated with the supplier on a substantially real-time basis, wherein the incentive is determined based on at least the point-of-sale information associated with the item and the purchasing information of the similar item associated with the competing supplier received from the at least one store; and provide the incentive to the point-of-sale terminal.

22. An article of manufacture comprising a non-transitory computer-readable storage medium having instructions stored thereon that, in response to execution by a computing device, cause the computing device to perform operations including:

receiving, from a point-of-sale terminal, an identifier associated with an item that has not yet been purchased by a customer;

determining point-of-sale information associated with the item based on a purchasing history, wherein the point-of-sale information includes:

a price at which the item was previously purchased at a particular point-of-sale terminal, information identifying the item that was previously purchased and the particular point-of-sale terminal, and information identifying a previously applied incentive that was applied to the price;

providing the point-of-sale information associated with the item to a remote computer associated with a supplier of the item on a substantially real-time basis;

providing to the remote computer associated with the supplier of the item, purchasing information of a similar item associated with a competing supplier received from at least one store;

receiving an incentive from the remote computer associated with the supplier on a substantially real-time basis, wherein the incentive is determined based on at least the point-of-sale information associated with the item and the purchasing information of the similar item associated with the competing supplier received from the at least one store; and providing the incentive to the point-of-sale terminal.

* * * * *